July 2, 1963 W. C. PEACOCK 3,095,740
MASS FLOW MEASUREMENT
Filed Dec. 9, 1959 3 Sheets-Sheet 1

INVENTOR.
WENDELL C. PEACOCK
BY
ATTORNEY

July 2, 1963    W. C. PEACOCK    3,095,740
MASS FLOW MEASUREMENT
Filed Dec. 9, 1959    3 Sheets-Sheet 2

INVENTOR.
WENDELL C. PEACOCK
BY
*Joseph Weingarten*
ATTORNEY

3,095,740
MASS FLOW MEASUREMENT
Wendell C. Peacock, Dover, Mass., assignor, by mesne assignments, to Laboratory For Electronics, Inc., Boston, Mass., a corporation of Delaware
Filed Dec. 9, 1959, Ser. No. 858,443
2 Claims. (Cl. 73—204)

The present invention relates in general to techniques for the measurement of material flow and more particularly to a totally passive system for the precise determination of mass flow having special advantage at exceedingly low temperatures.

Numerous devices for measuring the flow of materials through pipes and orifices have been devised. These instruments, generally referred to as flowmeters, operate in a variety of modes. One mode of operation is adapted to measure the linear flow of liquids or gases, while others are adapted to measure the volumetric flow and still others the mass flow. The applicability of a particular gage will depend on the nature of the measurement being performed. Thus, for example, in a system employing a reservoir in a fixed position with material flowing therefrom, level gages which determine the amount of material removed from the reservoir and thereby deductively arrive at the flowrate through a known orifice or pipe diameter can be utilized. This deductive method is however not always practical, either because the flow is slight compared to the quantity contained in the reservoir or because of motion of the entire system, which varies the position of the level within the reservoir.

Flow rate devices which measure the flow directly are applicable in the latter type of situations. In general there are three basic types of direct flow rate gages: turbine type, magnetic conduction, and pressure drop type. In the turbine type the number of revolutions of a turbine shaft actuated by the force of the stream against the turbine blades, provides the indication of mass flow rate. An electromagnetic gage can only be operated when the material to be measured is ionized. The pressure drop method utilizes the difference in pressure measured in the upstream and downstream directions to provide information as to the flow rate.

Modern technology in general and the advent of precision rocketry in particular have, however, placed new requirements as to accuracy, reliability, and stringent operating conditions on flowmeters. For example, in rocketry employing liquid fuels the efficiency of the rocket engine is dependent on maintaining at precise values the ratio of the fuel substances entering the combustion chamber. In this case the flow rates must be precisely measured either in the test stage to provide design information or in operation to provide a control signal for continuous adjustment of the control valves. In this application many devices, such as level gages measuring the amount of material in the reservoir, are entirely unsuitable because of the acceleration and variance of position of the rocket in flight. Conventional flowmeters in general have proved inadequate in rocketry for two significant reasons. The first reason is that the precision of such instruments has not been sufficient to operate under conditions where a very large mass of material flows in a very short time. The second deficiency which has become even more significant with the development of cryogenic fuels is the inability of many of these devices to act properly on liquified gases such as liquid hydrogen at temperatures in the range of 25 to 40 degrees Kelvin.

With regard to the precision of flow measurement in rockets, an accuracy of one percent is generally required for proper measurement of and control of the fuel mixing. With regard to liquid hydrogen in particular, the low density of this material (in the order of .05 gram per $cm.^3$) renders the turbine and pressure drop type of flowmeter entirely inadequate. Since the liquid hydrogen is not an ionized liquid, the magnetic type of flowmeter is also non-operable. Of course, since these rockets are in aerial flight and do not maintain a stabilized position, the level gage is ordinarily not applicable to this measurement.

In general, the requirements in rocketry for a fuel line flowmeter are, as indicated above, an accuracy in the order of one percent, a frequency response of 300 cycles per second, and a capability of measuring a flow rate of 100 feet per second in a pipe which may have an inner diameter in the range of one to eight inches. The pipe itself would typically have a wall thickness of $1/16$ to $1 5/8$ inches of steel.

It is therefore a primary object of the present invention to provide an accurate, compact flowmeter at reasonable cost to measure the mass flow of material on a continuous basis.

It is another object of the present invention to provide a precision measurement apparatus which will operate with cryogenic liquids.

It is still another object of the present invention to provide a precision flow measuring apparatus adapted particularly to operate for the measurement of liquid hydrogen.

Another object of this invention is to provide a liquid mass flow measuring apparatus which will operate under the conditions encountered in rocket engines.

Broadly speaking, the flowmeter of this invention obtains a measurement of the mass flow of material by continuously measuring the amount of heat required to raise the temperature of the material by a specified amount, or to restate it, the mass flow of material may be derived, if the change of temperature accomplished by the addition of a specific amount of heat to a substance is known. This method is based on the principle that the amount of heat required to raise the temperature of a material by a specific amount is a linear function of the mass of the material over a small range of temperature change. Mathematically this is expressed by the following equation:

$$M=\frac{H}{c\Delta T}$$

where M=the mass in grams; H=the heat added in calories; c is the specific heat of the material in calories per gram per degree centigrade; and $\Delta T$ is the change of temperature in degrees centigrade.

Physically, a heat source is mounted on, or incorporated into, the fuel line and adapted to provide a measured amount of heat to the liquid within the line. Temperature measuring devices are located on both the upstream and downstream sides of this heat source to indicate the change of temperature produced by the addition of the measured amount of heat. The information from the three devices can be either fed into a computer which has been calibrated using the specific heat of the particular liquid being measured or alternatively, in the case of a missile, telemetered back to a ground station for test information purposes.

One embodiment of this apparatus, in which the measurement accuracy is considerably enhanced, employs radioactive sources and detectors as temperature indicators. In this embodiment, advantage is taken of the fact that a change in the temperature of the material causes a change in the density of the material and, in the region of interest for liquid hydrogen, the percentage change in density is greater than the percentage change in temperature, while maintaining a linear relationship over a small region of temperature. The use of radioactive techniques for density measurement results in extremely high accuracy in measuring small changes of density, thus providing a significant increase in overall precision.

These and other objects and advantages will become apparent from the following detailed description when taken in conjunction with the accompanying drawing in which.

Figure 1:
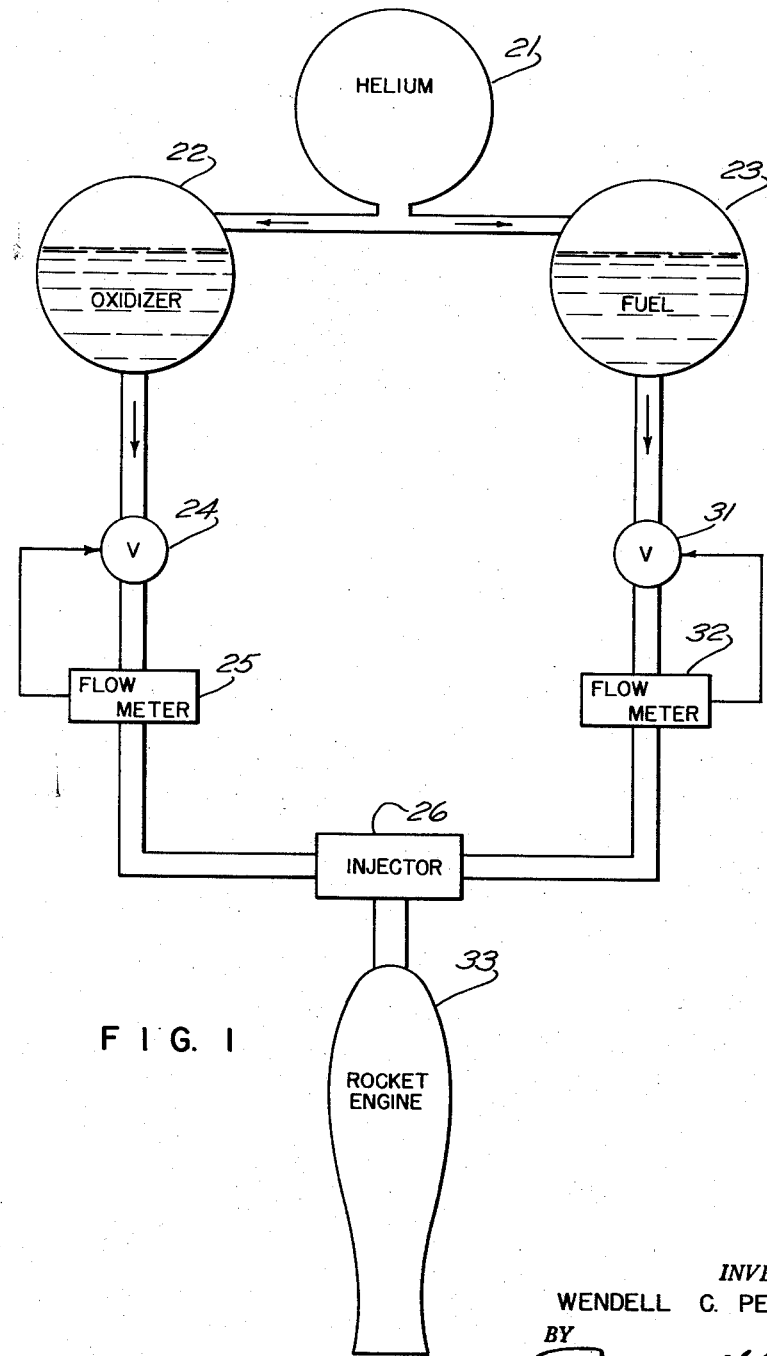
FIG. 1 is an illustration in block diagrammatic form of the fuel supply system of a rocket engine.

With reference now specifically to FIG. 1, a block diagram of a simplified fuel system for a typical rocket engine is shown. A pressure balance reservoir 21, which in this case contains helium at a high pressure, is shown coupled to oxidizer reservoir 22 and fuel reservoir 23. The oxidizer reservoir 22 is coupled through control valve 24 and flowmeter 25 to injector 26, while the fuel reservoir 23 is coupled through its control valve 31 and flowmeter 32, also to injector 26. The injector in turn supplies the fuel mixture to rocket engine 33. In a specific example the fuel in reservoir 23 may be liquid hydrogen, while the oxidizer may be liquid oxygen, fluorine, or a peroxide. The efficient operation of the rocket engine 33 requires that the ratio of the oxidizer to the fuel be maintained at a precise value. This ratio is of course obtained by operation of valves 24 and 31. The information from flowmeters 25 and 32 may be utilized in a feedback control loop (not shown) to control the position of valves 24 and 31 or, if these valves are preset at a single value, the information may be telemetered to an observation station in order to obtain data on efficiencies at that ratio. The pressure balance 21 is utilized to provide a constant back pressure against the fuel and oxidizer liquids since the flight of the rocket makes a gravity system impractical. The flowmeters required for this purpose must necessarily be indicative of the mass or weight of the material entering into the injector for combustion since it is this, rather than pure volume or linear flow, which controls the efficiency of the engine.

Figure 2:
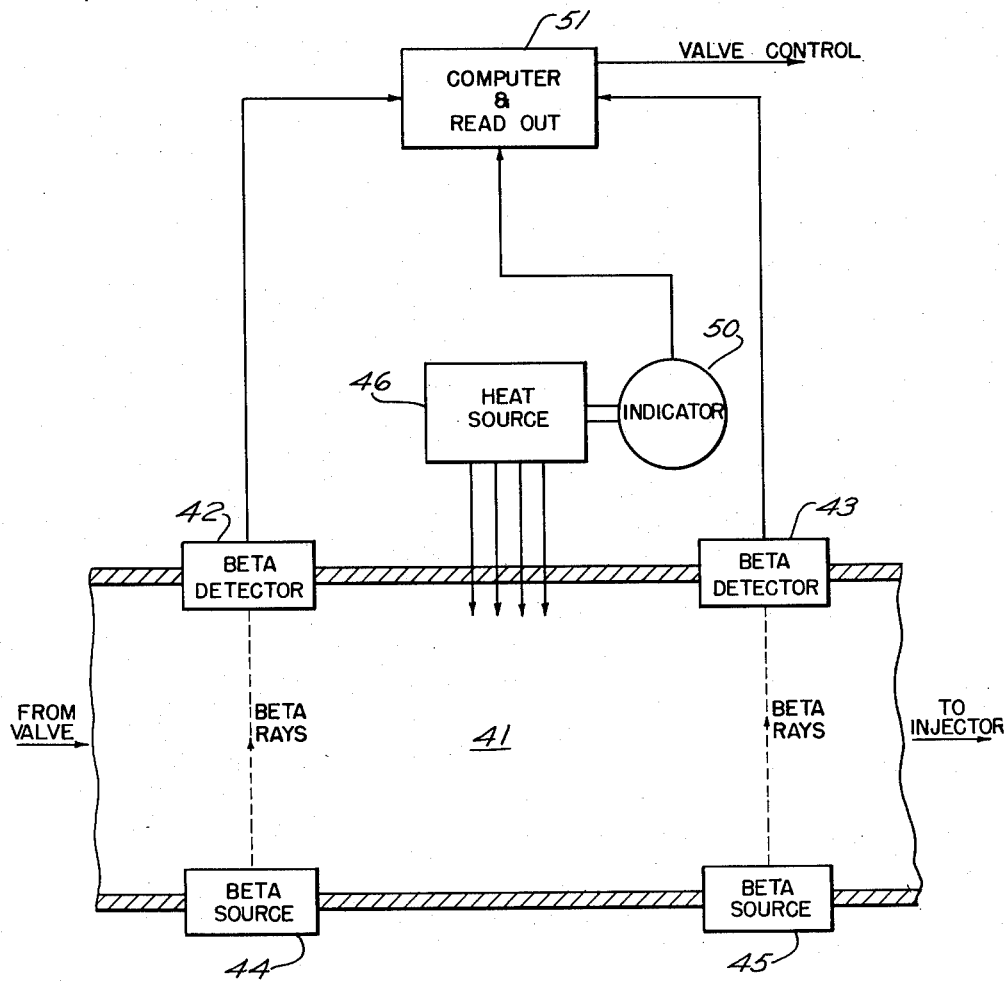
FIG. 2 is an illustration in block diagrammatic form of one embodiment of the apparatus of this invention.

With reference now specifically to FIG. 2 a preferred embodiment of the apparatus of this invention is illustrated. The supply line 41 of the valve to the injector has mounted on it two beta ray detectors 42 and 43, and disposed opposite each of these detectors, beta sources 44 and 45 respectively. The beta ray detectors may be any conventional form of radiation detector—for example, an ionization chamber. In the case of an ionization chamber, the output signal is a current, the magnitude of which is related to the amount of radiation falling on the chamber. The beta source may be any beta emitting radioisotope. The particular isotope chosen and the quantity to be used will depend somewhat on the amount of material to be interposed between source and detector. Thus for a large diameter pipe an energetic beta source such as strontium-90 is preferred. The radioactive material is hermetically sealed within a source mount. The amount of radiation from the source reaching the detector will vary with the density of material between them; hence the current output from the detector is representative of this density.

Between detectors 42 and 43 a heat source 46 is located in such a fashion that it may supply a controlled, or at least indicated, amount of heat, diagrammatically indicated by the arrows extending therefrom, to the liquid flowing through supply line 41. An indicator 50 continuously provides information as to the amount of heat supplied to supply line 41 and the liquid within it from source 46. This information, together with the information from beta detectors 42 and 43, is connected to a computer and readout unit 51 which, as will be described below, provides on a continuous basis information as to the mass of material flowing through supply line 41. In one application the computer output may be recorded and the information stored may be subsequently correlated with engine test performance for design purposes. Alternatively the information from the computer may be used to automatically control valves, similar to valves 24 and 31 in FIG. 1, thereby providing a continuously regulated flow.

Figure 3:
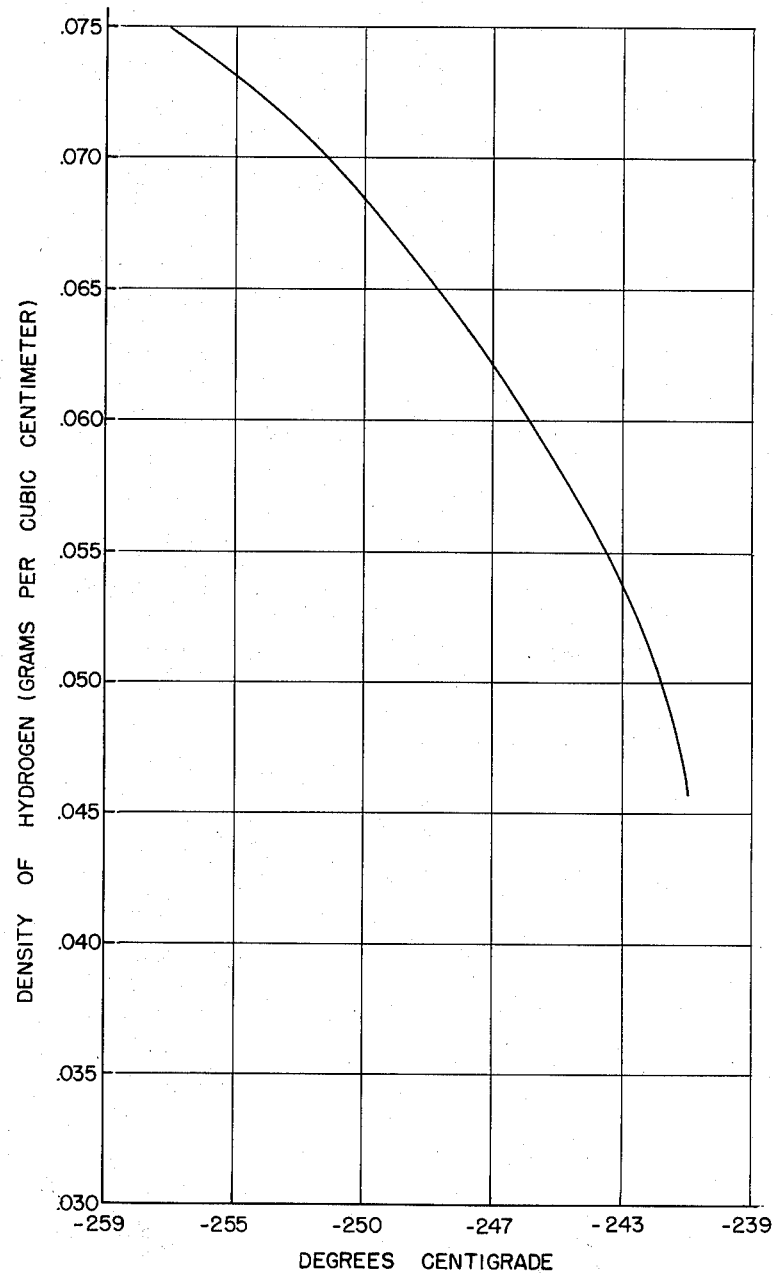
FIG. 3 is a graphical representation of the relationship between temperature and density for liquid hydrogen.

Considering now the operation of the flowmeter embodiment shown in FIG. 2, beta detector 42 and beta source 44 comprise a transducer which provides as an output a current representative of the density of material interrupting the radiation from the beta source to beta detector 42. This density measurement, located upstream from the heat source 46, provides an indication of the density of the material as a calibration point. Beta detector and source pair 43 and 45, located downstream from the heat source, provide a signal indicative of the density of the liquid after the heat has been added to it from heat source 46. Thus if the two detector and source pairs have been calibrated to give the same signal response to the same densities, the difference between the two signals serves as an indication of the change in density accomplished by the addition of the heat. As previously indicated, the difference in density is a function of the change in temperature; hence this difference represents the change of temperature of the liquid as a result of the addition of the amount of heat measured in indicator 50. The relationship of density and temperature for liquid hydrogen in the region of interest, which is between approximately $-240°$ C. and $-250°$ C., is illustrated in FIG. 3; the temperature in degrees centigrade being indicated on the horizontal ordinate while the density of liquid hydrogen in grams per cm.$^3$ is indicated on the vertical ordinate.

Taking a specific example, if the liquid hydrogen is at a temperature between $-247°$ C. and $-251°$ C., the relation of the density change to the temperature change can be expressed as $\Delta d = k\Delta T$, where $k$ has the dimensions $$\frac{\text{density}}{\text{temp.}}$$

and can be considered as constant for this region. Recalling the previously cited equation for the dependence of the relation of mass to the change of temperature, a new equation may be written for mass as a function of density as follows:

$$M = \frac{Hk}{c\Delta d}$$

where M is the mass in grams; H is the heat added in calories; $k$ is a constant expressed in grams per degrees centigrade derived from the curve of FIG. 3; $c$ is the specific heat for hydrogen which is expressed in calories per gram per degree centigrade; and $\Delta d$ is the difference in density resulting from the addition of heat, expressed in grams. The specific heat of hydrogen is less than .3 calorie per gram per degree centigrade. Typically a rocket fuel supply line might have an inner diameter of five inches and the liquid hydrogen linear velocity might be 100 feet per second at a temperature of approximately $-250°$ C. With a time constant of one millisecond, a heat source capable of delivering $22.7 \times 10^3$ calories would be required to raise the temperature of the fuel by 3° C. corresponding to an 8 percent change in density. Measurement of an 8 percent change in density of liquid hydrogen at $-250°$ C. can readily be done by beta sources and detectors as shown with an accuracy in the order of one percent.

The heat source might take any of several forms; for example, an electrically powered heating coil or element, a heat source supplied regeneratively from the heat developed in the rocket engine, or a stricture place in the supply line itself between the upstream and downstream density gages. In the latter case the rise in temperature, hence density, of the cryogenic liquid would itself be a predictable function of the mass flow through the stricture.

While the above preferred embodiment has described rocket fuel line flowmeters, particularly where liquid hydrogen is the fuel, the invention herein disclosed is equally suitable for other applications of flowmeters and measurement of other liquids. It is therefore obvious that many modifications and improvements may now be made by those skilled in this art; the invention disclosed herein should be construed as limited only by the spirit and scope of the appended claims.

What is claimed is:

1. Apparatus for determining the mass flow of a liquid stream comprising, a source of heat coupled to said stream and adapted to provide a predetermined quantity of heat per unit time to said stream; density gauging means coupled to said stream and adapted to determine continuously the difference in density of said stream occasioned by the addition of the said predetermined quantity of heat per unit time, means responsive to said density gauging means and adapted to generate an output signal related to the change in temperature represented by said change in density as indicative of said mass flow.

2. Apparatus in accordance with claim 1 wherein said means for determining the density of said stream comprises first and second beta radiation sources, said first beta radiation source being disposed at a point upstream of said heat source, said second beta radiation source being disposed at a point downstream of said heat source, said first and second sources being arranged to emit radiation through said stream in a direction normal to the flow of said stream; first and second radiation detectors, said first detector being disposed to measure radiation from said first source transmitted through said stream, said second detector being disposed to measure radiation from said second source transmitted through said stream; means adapted to continuously measure the difference between the response of said first and said second detector, whereby the difference in density occasioned by said heat source is obtained.

References Cited in the file of this patent

UNITED STATES PATENTS

| | | |
|---|---|---|
| 1,808,709 | Blake | June 2, 1931 |
| 2,304,910 | Hare | Dec. 15, 1942 |
| 2,316,239 | Hare | Apr. 13, 1943 |
| 2,627,543 | Obermaier | Feb. 3, 1953 |
| 2,832,018 | Laub | Apr. 22, 1958 |